Figure 1:
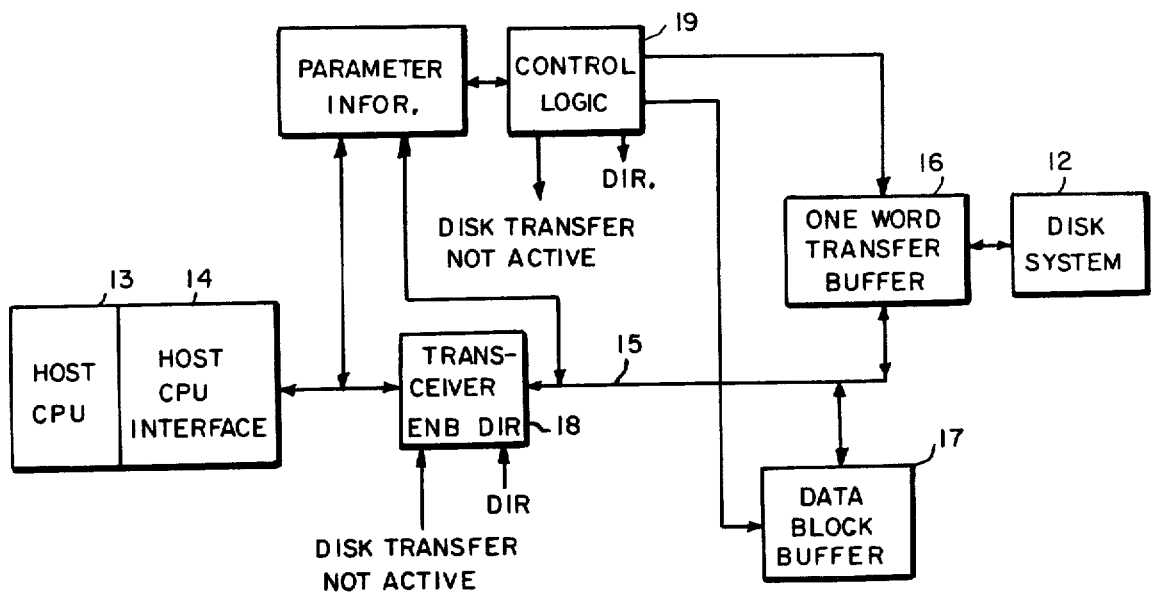

United States Patent [19]

Frissell

[11] 4,228,501

[45] Oct. 14, 1980

[54] DATA TRANSFER TECHNIQUE FOR USE WITH PERIPHERAL STORAGE DEVICES

[75] Inventor: John M. Frissell, Dracut, Mass.

[73] Assignee: Data General Corporation, Westboro, Mass.

[21] Appl. No.: 917,631

[22] Filed: Jun. 21, 1978

[51] Int. Cl.² .............................................. G06F 13/04
[52] U.S. Cl. ................................................... 364/200
[58] Field of Search ... 364/200 MS File, 900 MS File

[56] References Cited

U.S. PATENT DOCUMENTS

| Re. 27,157 | 7/1971 | Herold et al. | 364/200 |
|---|---|---|---|
| 3,593,314 | 7/1971 | Moll | 364/200 |
| 3,999,163 | 12/1976 | Levy | 364/200 |
| 4,007,448 | 2/1977 | Sergeant et al. | 364/200 |
| 4,032,898 | 6/1977 | Grigoletti | 364/200 |
| 4,050,097 | 9/1977 | Miu et al. | 364/200 |
| 4,064,489 | 12/1977 | Babb | 364/200 |
| 4,101,969 | 7/1978 | Lawson et al. | 364/900 |

Primary Examiner—Mark E. Nusbaum
Attorney, Agent, or Firm—Robert F. O'Connell

[57] ABSTRACT

Data processing apparatus wherein circuitry for data transfer between a central processor unit (CPU) and a peripheral storage unit, such as a hard disk storage unit, comprises a data transfer bus by which a block of data words being transferred is supplied to a temporary storage unit capable of storing the entire block. Means are provided to prevent any data transfer between the data bus and the CPU interface unit while the block of data words is transferred between the temporary storage unit and the peripheral storage unit and to permit transfer between the CPU interface unit and the bus when data is not being transferred between the temporary storage unit and the peripheral storage unit.

7 Claims, 2 Drawing Figures

DATA TRANSFER TECHNIQUE FOR USE WITH PERIPHERAL STORAGE DEVICES

INTRODUCTION

This invention relates generally to data transfer techniques utilized in data processing systems and, more particularly, to improved techniques for transferring data between a host central processor unit and a peripheral storage unit such as a disk storage device.

BACKGROUND OF THE INVENTION

In transferring data between a host central processor unit and a disk storage unit, the cost of the disk system, such as a "hard" disk system in contrast with a more flexible "cartridge" or "floppy" disk system, has been relatively high where high data densities and high transfer rates are required. Normally, such disks have been used with relatively expensive host central processor units in which the channel data transfer rate is higher than that of the disk transfer rate. In such situations there is usually no problem in transferring data directly to and from the disk system with reference to the host central processor unit.

However, as the cost of such disks have become considerably reduced, the use of such hard disks with high data density and high transfer rates is now possible with much less expensive host central processor units. In such systems, however, the host central processor unit channel data transfer rate is often lower than that of the disk system. Accordingly, data cannot be directly transferred to the host central processor unit since the latter transfer rate cannot keep up with the disk system transfer rate and direct transfer becomes substantially impossible. In order to avoid such a problem such systems often use large capacity "first in-first out (FIFO)" buffer storage systems. In accordance therewith each data word obtained from the disk during a read operation, for example, is supplied to the buffer and temporarily stored before it is transferred to the host central processor unit. Because of the high data transfer rate of the disk relative to the channel transfer rate to the CPU, more and more data words remain stored in the FIFO buffer before they are transferred out to the CPU. If a large number of data words are required to be transferred, a relatively large capacity FIFO buffer is required and the expense of the overall transfer system can become relatively high.

Other techniques utilizing various complex systems of multiplexer units have also been utilized for such purpose and the costs thereof are also relatively high, particularly where the disk system is to be used with a relatively inexpensive processor. Therefore, it is desirable to design a system which will provide a low cost technique for transferring data between a central processor unit and a hard disk storage unit wherein the data transfer rate of the latter unit is substantially faster than the channel data transfer rate with respect to the central processor unit.

BRIEF SUMMARY OF THE INVENTION

In accordance with the invention, such data transfer is obtained by utilizing a data transfer bus between the disk system and the CPU channel which includes a bi-directional transceiver element and a relatively large capacity standard random-access buffer storage element controllably operative in the data transfer path so that an entire block of data words which are to be transferred are temporarily placed in the buffer storage system before transfer to their destination. During a read operation, for example, while such data is transferred from the disk to the buffer storage element, the transceiver element is disabled so that no data can be transferred to or from the CPU. Following such transfer the transceiver is then enabled and the transfer thereupon takes place from the buffer storage element to the central processor unit. During a write operation transfer from the host central processor unit to the storage element takes place when the transceiver is enabled. The transceiver is then disabled to prevent transfer to or from the CPU and the transfer to the disk thereupon takes place from the buffer unit.

The use of a standard random-access data block storage buffer element and transceiver unit represents a much lower cost technique for transferring data between the CPU and the disk than that which utilizes a relatively expensive, high capacity FIFO buffer or a relatively complex and expensive array of multiplexer units.

DESCRIPTION OF THE INVENTION

Figure 2:
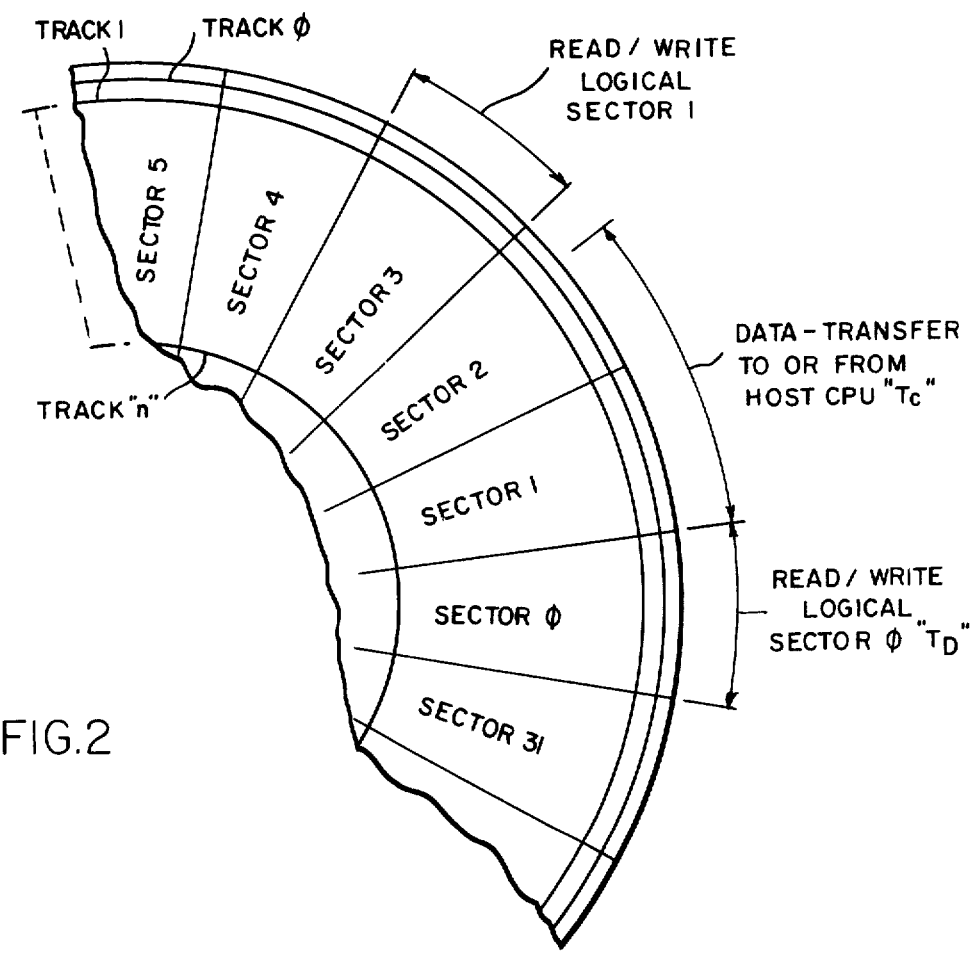

The invention can be described in more detail with the help of the accompanying drawings wherein FIG. 1 shows a portion of a hard disk on which data can be stored; and FIG. 2 shows a block diagram of a preferred embodiment of the data transfer system in accordance with the invention.

As can be seen in FIG. 1, the surface of a disk platter can be divided into a number (n) of tracks, with each track storing binary data in a serial fashion. Each track can be further divided into a plurality of separate physical sectors on each of which a block of data words can be stored. In a specific hard disk system, for example, each disk surface may comprise thirty-two physical sectors (identifiable as sectors $\phi$-31, on any track), some of which are shown in the portion of the disk depicted in FIG. 1.

For example, each sector may be capable of storing a block of 256 data words so that any track is capable of storing 8K words.

A read or write data transfer operation from or to the disk takes place with respect to a data block in a specific sector during the time represented by the time "$T_D$" as shown in FIG. 1 with reference to sector $\phi$. The data transfer operation to or from the host central processor unit channel, however, requires a longer time which is representatively shown in FIG. 1 by the time "$T_C$". In the particular example shown $T_C$ is almost equal to the time for transferring a data block of words from two sectors of the disk.

In accordance with the technique of the invention, a transfer from the disk during a read operation, for example, occurs during the time period $T_D$ required to access the entire data word block stored in sector $\phi$, such data being temporarily stored in a suitable data block buffer storage unit. The transfer to the host central processor unit at the end of time $T_D$ thereupon takes place until the entire block of data words which have been stored in the data block buffer unit has been fully transferred to the host central processor unit, i.e., during the time period $T_C$. During the transfer between the disk and the data block buffer, the system is arranged so that no data transfer to or from the host central processor unit can occur.

When the disk has rotated to a physical sector 3, following the transfer of data in sector $\phi$ to the CPU, another read operation, for example, can take place thereat. Therefore, the latter physical sector can be utilized as the next logical sector, identified in the drawing as logical sector 1. For a 32-sector disk in which disk data transfers can take place at a rate of one word every two microseconds and the host data transfer takes place in substantially a longer time, but less than one word every four microseconds, every third physical sector on the 32-sector disk surface can be designated at the next sequential logical sector, as shown in the following exemplary sequence.

| Physical Sector | Logical Sector |
|---|---|
| $\phi$ | $\phi$ |
| 3 | 1 |
| 6 | 2 |
| 9 | 3 |
| 12 | 4 |
| 15 | 5 |
| 18 | 6 |
| 21 | 7 |
| 24 | 8 |
| 27 | 9 |
| 30 | 10 |
| 1 | 11 |
| 4 ... | 12 ... |

A system for implementing such technique is shown in the block diagram of FIG. 2. Thus, a disk system 12 which may comprise one or more "hard" disks of the type discussed above is utilized as a peripheral storage system with reference to a host central processor unit (CPU 13) which communicates to the disk system via host CPU interface circuitry 14 and a data transfer bus 15. The disk system is of a known type and the host central processor unit may be any appropriate central processor unit having a channel data transfer rate which is less than that of the disk system and utilizing any suitable host CPU interface circuitry. One example of a host central processor unit and central processor interface circuitry may be units of the type made and sold by Data General Corporation, Westboro, Mass. under the model designation microNOVA Data Processing System, as described, for example, in the publication "microNOVA Integrated Circuits Data Manual for Design Engineers", Second Edition, 1977, available from such company.

A one-word transfer buffer storage element 16 provides for the storage of single words to or from the disk system during a write or read operation respectively, in accordance with standard practice. A relatively large capacity buffer storage unit identified as data block buffer 17 is also in communication with bus 15. Between bus 15 and host CPU interface 14 is a bidirectional transceiver unit 18 which, in effect, acts as a gating unit which can be enabled to permit a transfer of data in either direction between the host CPU interface and bus 15. The transceiver unit 18 can be disabled to prevent any such transfer.

Appropriate control logic 19 of the type normally required in a disk transfer system which uses suitable parameter information transferred to and from both the host CPU and the disk system in accordance with standard practice also is utilized as shown. The control logic is arranged to provide an appropriate signal for enabling the transceiver unit 18, such signal being identified as the "Disk Transfer Not Active" signal which is supplied to the enable (ENB) terminal of transceiver unit 18. The latter unit may comprise Octal Bus Transceiver units made and sold by Texas Instruments under the model designation 74LS245. As is well known to those in the art, such a device when enabled will permit a transfer in either direction of data supplied thereto. When disabled, such unit will prevent any such transfer so that, in effect, the unit acts as a gating device, the direction of transfer, when enabled, being determined by a suitable direction control signal DIR from control logic 19.

In accordance with the operation of the system in FIG. 2, during a disk read data transfer a sector (e.g., logical sector $\phi$) of the disk is read and the block of data words therein are transferred one by one through transfer buffer 16 into data block buffer 17 via bus 15. The latter buffer element may be a standard random access memory (RAM) unit having appropriate addressing circuit as would be well known to those in the art. During the storage of the complete data block into buffer 17 the transceiver unit 18 is disabled (there is no DISK TRANSFER NOT ACTIVE signal present at the enable input thereof) so that no data transfer can occur between the host CPU interface circuitry and the data transfer bus 15. The transfer from disk 12 to buffer 17 takes place during the time $T_D$ as discussed above.

At the end of $T_D$ the Disk Transfer Not Active signal is asserted and the transceiver unit is enabled, the appropriate DIR signal also being asserted to control the direction of transfer from the data bus to the host CPU interface. During the time period $T_C$ the block of data words stored in buffer 17 is transferred through transceiver unit 18 to the host CPU interface and thus to the host CPU 13. At the end of such transfer the disk system is then ready for a subsequent transfer from logical sector 1 (physical sector 3) to the data block buffer element 17, transceiver unit 18 thereby being disabled by the non-assertion of the DISK TRANSFER NOT ACTIVE signal.

During a write operation the transceiver unit 18 is appropriately enabled, the DIR signal being asserted to control the transfer of data from the host CPU interface 14 to the data transfer bus 15 so that data from the host CPU is stored in data block buffer unit 17. Such storage takes place during a time period equal to $T_C$, at the end of which the transceiver unit is disabled so that no transfer can take place between the data bus and the CPU. The block of data words which has been stored in buffer 17 is thereupon transferred one word at a time through transfer buffer 16 onto the surface of the disk at the relatively high rate of data transfer thereof onto an appropriate physical sector corresponding to the desired logical sector as discussed above.

In accordance with such implementation and operation, a hard disk system having high data density and high data transfer rate of operation can be used with a simple processor unit having a relatively low channel data transfer rate at a relatively low cost, the cost of RAM buffer 17 and transceiver unit 18 being substantially less than that of the FIFO buffer units required previously or the complex multiplexing systems which have been previously suggested.

What is claimed is:

1. A data processing system comprising
   a central processor unit;
   central processor interface means for transferring data to and from said central processor unit at a first transfer rate;

data storage means including
means for storing data;
means for writing data into said data storing means; and
means for reading data from said data storing means;
said writing and reading of data occurring at a second transfer rate which is higher than said first transfer rate, said data writing means including means for storing blocks of data words in separate storage sectors, successively used blocks of data words being stored in nonadjacent ones of said storage sectors;
data transfer bus means for use in transmitting data between said central processor means and said data storage means;
temporary storage means in bi-directional communication with said bus means for storing a block of data words therein, said temporary storage means having a storage capacity sufficient to store all of the data words stored in any one of said storage sectors;
control means for successively selecting non-adjacent storage sectors of said data storage means with respect to which data transfers are to occur; and
means for transferring blocks of data words between said central processor interface means and said temporary storage means, the transfer of a block of data words with respect to one selected storage sector being completed during the intervening time period between the transfer of a block of data words with respect to said one selected storage sector and the transfer of a block of data words with respect to the next selected storage sector; and
means positioned between said central processor interface means and said bus means and responsive to said control means for preventing the transfer of data between said interface means and said temporary storage means on said bus means when data is being transferred between said data storage means and said temporary storage means and for permitting the transfer of data between said interface means and said temporary storage means on said bus means when data is not being transferred between said data storage means and said temporary storage means.

2. A data processing system in accordance with claim 1 wherein said data storage means is a disk storage system.

3. A data processing system in accordance with claim 2 wherein said disk storage system utilizes rigid storage disks capable of having data stored on a surface thereof.

4. A data storage system in accordance with claims 2 or 3 wherein the surfaces of said storage disks are divided into said separate storage sectors.

5. A data processing system in accordance with claim 4 wherein said temporary storage means is a random access memory means.

6. A data processing system in accordance with claim 5 and further including a data transfer buffer means between said disk storage system and said temporary storage means for transferring data therebetween, said transfer buffer means having a storage capacity substantially lower than that of said temporary storage means.

7. A data processing system in accordance with claim 6 wherein said transfer buffer means has a storage capacity of one data word.

* * * * *